US008885096B2

(12) United States Patent
Vakil

(10) Patent No.: US 8,885,096 B2
(45) Date of Patent: Nov. 11, 2014

(54) MULTI-MEDIA DEVICE CONTAINING A PLURALITY OF IMAGE CAPTURING DEVICES

(75) Inventor: Bharat Vakil, Coral Springs, FL (US)

(73) Assignee: OpenPeak Inc., Boca Raton, FL (US)

(*) Notice: Subject to any disclaimer, the term of this patent is extended or adjusted under 35 U.S.C. 154(b) by 10 days.

(21) Appl. No.: 13/278,771

(22) Filed: Oct. 21, 2011

(65) Prior Publication Data
US 2012/0274800 A1 Nov. 1, 2012

Related U.S. Application Data

(60) Provisional application No. 61/405,271, filed on Oct. 21, 2010.

(51) Int. Cl.
H04N 5/225 (2006.01)
H04N 5/232 (2006.01)

(52) U.S. Cl.
CPC ............ *H04N 5/2257* (2013.01); *H04N 5/2252* (2013.01)
USPC ........ 348/374; 348/373; 348/262; 348/211.11

(58) Field of Classification Search
USPC ............... 348/42, 43, 46, 47, 48, 51, 53, 153, 348/159, 207.99, 211.11, 211.12, 262, 263, 348/264, 369, 373, 374; 396/322, 324, 325, 396/332, 333, 334, 335, 336
See application file for complete search history.

(56) References Cited

U.S. PATENT DOCUMENTS

| | | | | |
|---|---|---|---|---|
| 6,836,669 | B2* | 12/2004 | Miyake et al. | 455/556.1 |
| 7,255,600 | B2* | 8/2007 | Ma | 439/607.04 |
| 7,539,412 | B2 | 5/2009 | Lee et al. | |
| 7,714,931 | B2 | 5/2010 | Singh et al. | |
| 2004/0021792 | A1 | 2/2004 | Yasui | |
| 2005/0046740 | A1* | 3/2005 | Davis | 348/373 |
| 2005/0285973 | A1* | 12/2005 | Singh et al. | 348/374 |
| 2006/0146152 | A1 | 7/2006 | Jo et al. | |
| 2007/0070204 | A1* | 3/2007 | Mentzer | 348/207.99 |
| 2009/0017867 | A1* | 1/2009 | Koh | 455/556.1 |

FOREIGN PATENT DOCUMENTS

| | | |
|---|---|---|
| WO | 2012/054846 A2 | 4/2012 |
| WO | 2012/054846 A3 | 4/2012 |

OTHER PUBLICATIONS

International Search Report and Written Opinion received for International Application No. PCT/US2011/057312, mailed on May 1, 2012, 9 pages.

* cited by examiner

*Primary Examiner* — Twyler Haskins
*Assistant Examiner* — Peter Chon

(57) ABSTRACT

A multi-media device and a method for manufacturing the multi-media device is described herein. The multi-media device includes a first and second substrate coupled to each other. Both the first and second substrates have a first side and a second side opposite to the first side. The multi-media device further includes a first camera coupled to the first side of the first substrate and a second camera coupled to the first side of the second substrate. The first camera includes a first lens housing, which houses one or more first lenses. The second camera includes a second lens housing, which houses one or more second lenses. The second substrate is coupled to the first substrate in a manner such that the one or more first lenses and the one or more second lenses receive light from opposite directions.

30 Claims, 13 Drawing Sheets

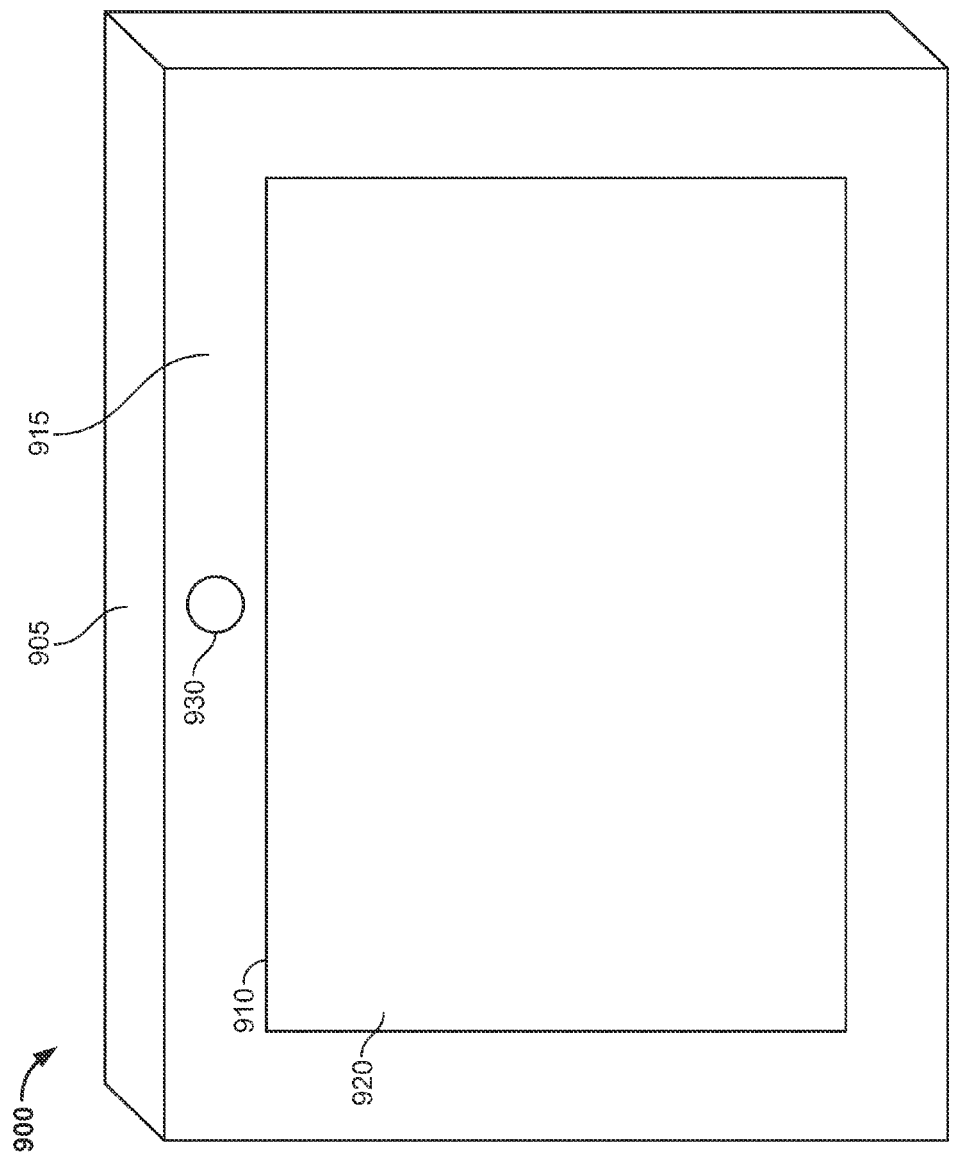

MULTI-MEDIA DEVICE CONTAINING A PLURALITY OF IMAGE CAPTURING DEVICES

CROSS-REFERENCE TO RELATED APPLICATIONS

This application claims priority to U.S. Provisional Patent Application No. 61/405,271, filed Oct. 21, 2010, the entirety of which is incorporated by reference herein.

BACKGROUND

1. Field

The present subject matter generally relates to multi-media devices. In particular, the present subject matter relates to multi-media devices that contain a plurality of image capturing devices.

2. Background

Manufacturers of multi-media devices are constantly faced with the task of providing more and more features for their products while limiting the footprint and expense of such enhancements. In addition to spatial limitations and cost concerns, engineers must consider the negative effects on battery life and processing burdens that these new features may bring. One particular application for these devices that has garnered recent attention is video calling capability. Many carriers have asked device manufacturers to incorporate this technology into the products that the carriers offer without significantly affecting the quality of pre-existing applications, battery life, processing capability and cost. As such, there is a need to develop solutions that enable the implementation of this feature without introducing the issues described above.

BRIEF SUMMARY

Various approaches are described herein for, among other things, incorporating multiple image processing devices into a multi-media device while adhering to fiscal, spatial and power restraints. For example, two cameras may be arranged in such a manner that each camera is facing an opposite direction. The two cameras may be positioned laterally with respect to another in order to define, at least in part, a space in which to position a display or some other component of the multi-media device. In addition, a single image signal processor may be used to process images from both cameras. By implementing the various approaches described above and herein, the cost of manufacturing the multi-media device, the size of the multi-media device, and the power consumed by the multi-media device may be reduced.

For example, a multi-media device is described herein. The multi-media device includes a first substrate that is coupled to a second substrate. The first substrate has a first side and a second side opposite to the first side of the first substrate. The second substrate has a first side and a second side opposite to the first side of the second substrate. The multi-media device further includes a first camera coupled to the first side of the first substrate and a second camera coupled to the first side of the second substrate. The first camera includes a first lens housing, which houses one or more first lenses. The second camera includes a second lens housing, which houses one or more second lenses. The second substrate is coupled to the first substrate in a manner such that the one or more first lenses are configured to receive light generally from a first direction and the one or more second lenses are configured to receive light generally from a second direction that is opposite to the first direction.

A method for manufacturing the multi-media device is also described herein. The method includes coupling a first substrate to a second substrate. The first substrate has a first side and a second side opposite to the first side of the first substrate. The second substrate has a first side and a second side opposite to the first side of the second substrate. The method also includes coupling a first camera to the first side of the first substrate. The method further includes coupling a second camera to the first side of the second substrate. The first camera includes a first lens housing, which houses one or more first lenses. The second camera includes a second lens housing, which houses one or more second lenses. The first substrate is coupled to the second substrate in a manner such that the one or more first lenses are configured to receive light generally from a first direction and the one or more second lenses are configured to receive light generally from a second direction that is opposite to the first direction.

A mobile device is also described herein. The mobile device includes a front-facing camera that faces a first direction and a second camera that faces a second direction that is substantially opposite to the first direction. The mobile device also includes a host processor and an image signal processor that is communicatively coupled to the host processor. The image signal processor processes images captured by both the front-facing camera and the rear-facing camera.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments and, together with the description, further serve to explain the principles involved and to enable a person skilled in the relevant art(s) to make and use the disclosed technologies.

FIG. 9 is a front view of a multi-media device in accordance with one embodiment.

Figure 1:
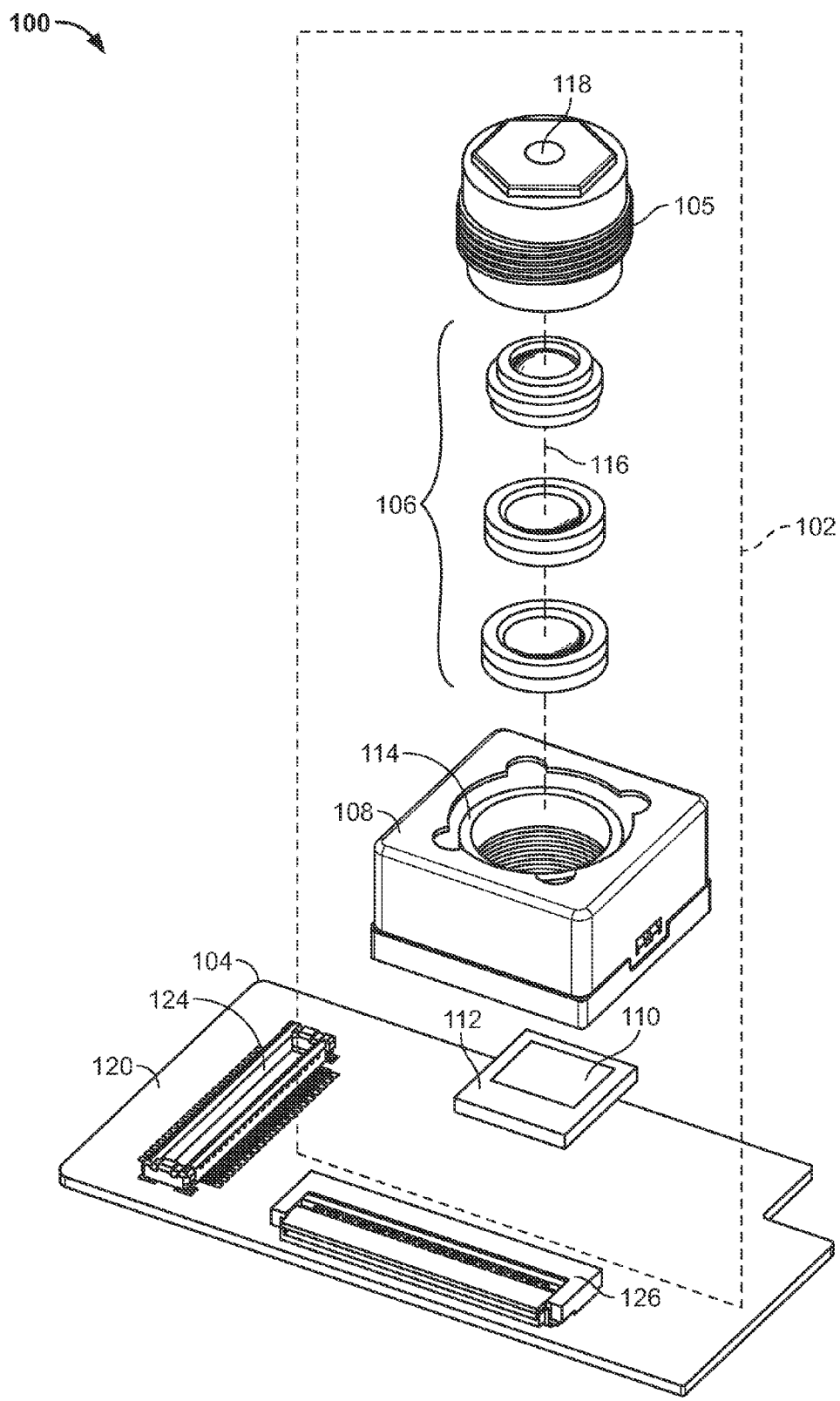
FIG. 1 is an exploded perspective view of a first camera module in accordance with one embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments. However, the scope of the subject matter described herein is not limited to these embodiments, but is instead defined by the appended claims. Thus, embodiments beyond those shown in the accompanying drawings, such as modified versions of the illustrated embodiments, may nevertheless be encompassed by the claims.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Several definitions that apply throughout this document will now be presented. A "multi-media device" is defined as an electronic device that is capable of generating, displaying and/or broadcasting any combination of sensory-stimulating content, such as text, audio, still images, moving images, animation and interactivity. A "camera" is defined as a device that is capable of capturing one or more images when activated. The term "still image camera" means a camera that is designed to capture a single image at a time when activated. A "moving images camera" is defined as a camera that is designed to capture a plurality of images over a period of time when activated. An "image signal processor" is defined as one or more components that are configured to supplement a host processor by at least processing any number of images captured by a camera. The term "host processor" is defined as one or more components that are configured to be the primary element for coordinating and executing the functions of a multimedia device. An "image" is defined as a representation of one or more objects that have been reduced to a form that can be processed by a machine. A "display" is an interface that is capable of presenting images in a form that is viewable by a human. A "housing" is a physical structure that at least partially encloses and/or provides support for one or more components. The term "video call" is defined as a communication between at least two points in which at least a portion of the communication involves the transmission or transfer of a plurality of images. The term "substrate" is defined as a physical material upon which a semiconductor device (e.g., an integrated circuit) is applied. An example of a substrate may be a printed circuit board, or any other support structure known in the art used to support semiconductor devices and hereinafter developed for performing functions of a printed circuit board. The term "printed circuit board" is defined as a board used to mechanically support and electrically connect electronic components using conductive pathways, tracks or signal traces etched from sheets of conductive material (e.g., copper) laminated onto a non-conductive substrate (e.g., plastic, fiberglass, or any other dielectric suitable to serve as a non-conductive substrate for a printed circuit board).

As noted earlier, manufacturers of consumer-oriented devices are faced with the difficult task of incorporating additional features into multi-media devices while adhering to fiscal, spatial and power restraints. Embodiments of the present invention described herein seek to address this issue by providing additional camera functionality without significantly affecting the existing performance or expense of a multi-media device.

In one embodiment, two cameras may be arranged in such a manner that each camera is facing a substantially opposite direction. The two cameras may be positioned laterally with respect to another in order to define, at least in part, a space in which to position a display or some other component of the multi-media device. In addition, a single image signal processor may be used to process images from both cameras. By implementing the various approaches described above and herein, the cost of manufacturing the multi-media device, the size of the multi-media device, and the power consumed by the multi-media device may be reduced.

II. Example Embodiments

FIG. 1 is an exploded perspective view of a first camera module 100 in accordance with one embodiment. As shown in FIG. 1, first camera module 100 includes a camera 102 and a substrate 104. Camera 102 includes a lens barrel 105, one or more lenses 106, a lens housing 108, an image sensor 110, and an image signal processor 112. Lens barrel 105 is configured to house one or more lenses 106. Lens housing 108 is formed to receive and house lens barrel 105. Lens(es) 106 are configured to receive light from a light source via an opening 118 of lens barrel 105. Image sensor 110 is configured to detect light transmitted through lens(es) 106 and convert the detected light into an electrical signal that represents an image. The electrical signal is transmitted to image signal processor 112. Using various algorithms, image signal processor 112 processes the image received from image sensor 110. The term "processes images" or "processing the image" is defined as one or more actions that are employed to modify or alter data contained in an image.

Image signal processor 112 can process the captured images in accordance with any suitable image processing algorithm. For example, image signal processor 112 can process raw data that represents the captured images into a suitable file format, like Y'UV, YUV, YCbCr, YPbPr or any other file format. As another example, image signal processor 112 can perform automatic exposure control (AEC), automatic gain control (AGC) or automatic white balance (AWB) and can resize images as needed. As an option, image signal processor 112 can be configured to compress the images into a suitable format by employing any available compression standard, such as JPEG or MPEG and their associated variants. As will be described below, it is not necessary that image signal processor 112 perform all these techniques, as some of them may not be necessary or may even be executed by a host processor (e.g., host processor 512 shown in FIG. 5A).

In an example embodiment, image sensor 110 and image signal processor 112 may be integrated together as part of a system-on-a-chip (SoC). Accordingly, image sensor 110 and image signal processor 112 may be situated on the same silicon substrate. In another example embodiment, image sensor 110 and image signal processor 112 may be located on separate chips. Accordingly, image sensor 110 and image signal processor 112 may be situated on different silicon substrates.

In accordance with one embodiment, first camera 102 may be a fixed focus camera. In accordance with another embodiment, first camera 102 may an autofocus camera. In accordance with this embodiment, lens housing 108 may comprise a voice coil motor (VCM), which includes a coil 114 and one or more magnets (not shown). As is known in the art, a VCM acts as an actuator that moves lens(es) 106 along an optical axis direction 116 by virtue of an interaction between a magnetic field generated by a current flowing through coil 114 and the magnetic field of the one or more magnets. The interaction between the magnetic field generated by the current flowing through coil 114 and the magnetic field of the one or more magnets generate a rotational force. The rotational force acts as a driving force to rotate lens barrel 105, which houses lens(es) 106, along optical axis 116. Lens barrel 105 is rotated until an appropriate focal length of the camera is reached.

In accordance with another embodiment, first camera 102 may be a moving images camera, which can be used for example to conduct video calls. In accordance with another implementation, first camera 102 may be a still image camera.

Figure 3:
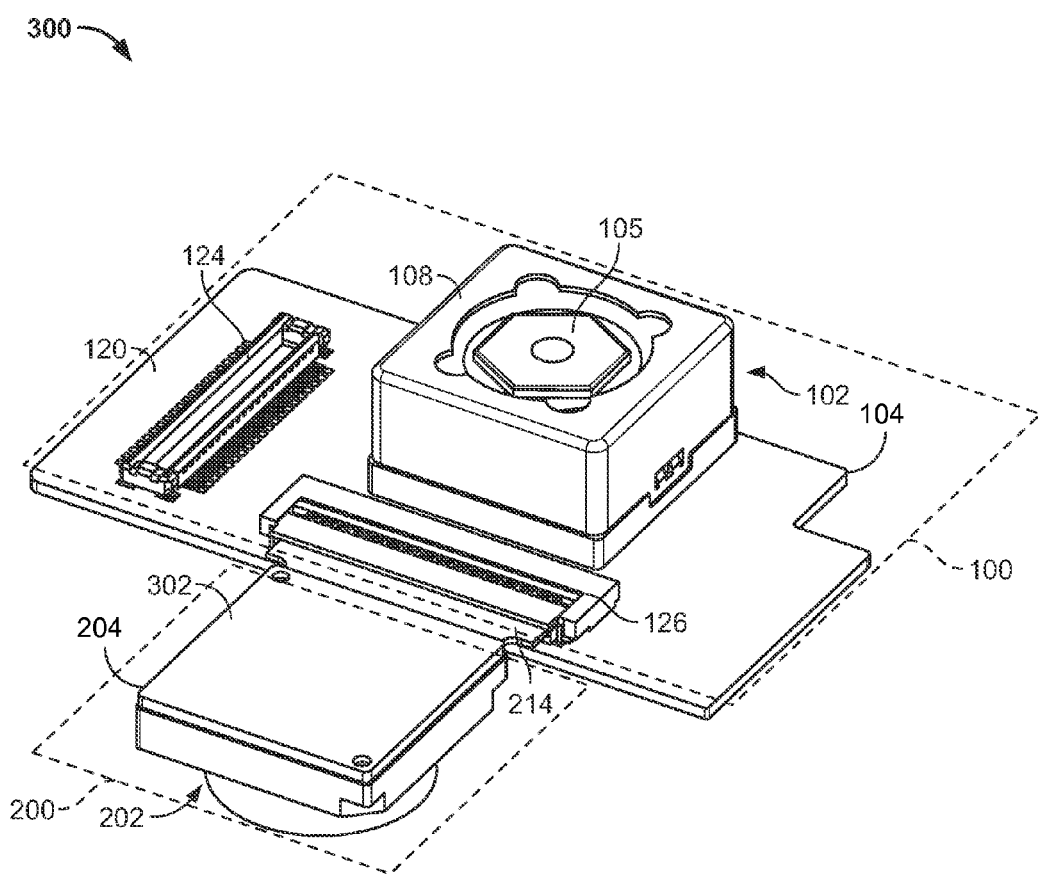
FIG. 3 is a perspective top view of a coupled first camera module and a second camera module in accordance with one embodiment.
Figure 4:
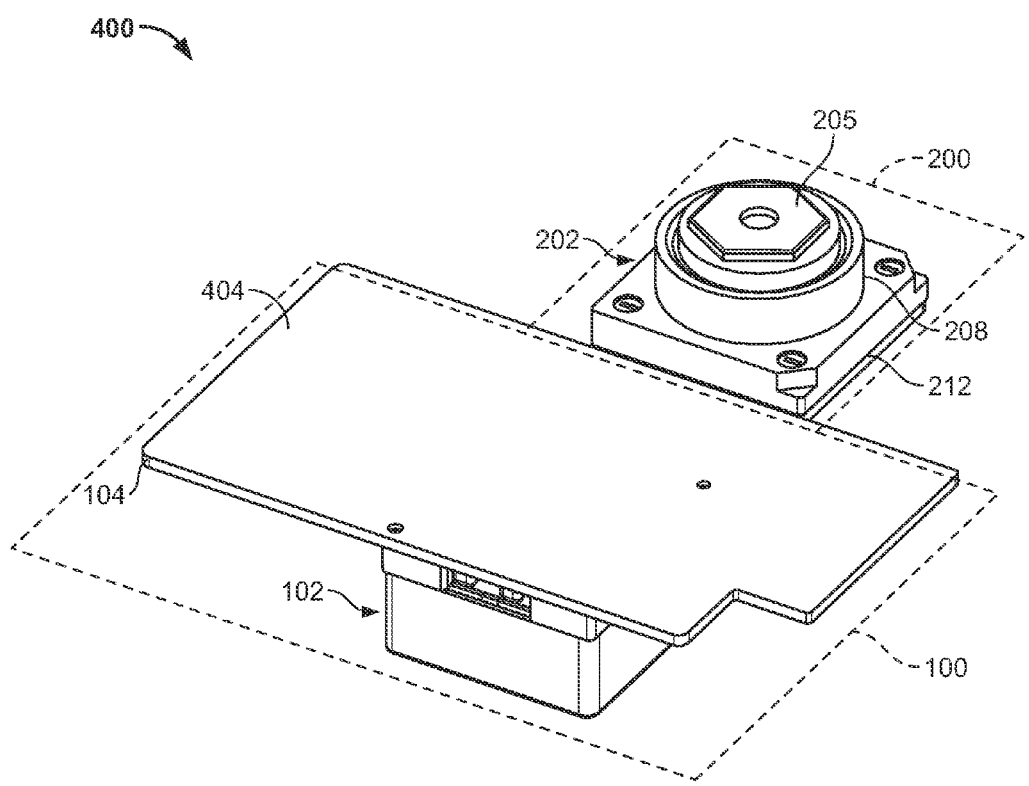
FIG. 4 is a perspective bottom view of a coupled first and second camera module in accordance with one embodiment.

Substrate 104 has a top side 120 and a bottom side 404 (as shown in FIG. 4). Image sensor 110 and image signal processor 112 may be directly mounted mechanically and electrically to top side 120. Image sensor 110 and image signal processor 112 may be mounted mechanically and electrically to top side 120 using any of a variety of surface mounting techniques known in the art (e.g., flip-chip, wire bonding, ball bonding, chip bonding, and/or the like). As shown in FIG. 3, lens housing 108 is also configured to be directly mounted mechanically and/or electrically to top side 120. Lens housing 108 may be mounted to top side 120 in a manner such that lens housing 108 covers image sensor 110 and image signal processor 112. Accordingly, lens housing 108 may also house image sensor 110 and image signal processor 112 along with lens barrel 105 and lens(es) 106.

As further shown in FIG. 1, top side 120 of substrate 104 includes a first connector 124 and a second connector 126. First connector 124 and second connector 126 are communicatively coupled to first camera 102 (in particular, to image sensor 110 and image signal processor 112 of first camera 102) via an electrically-conductive material (not shown). The electrically-conductive material may include, but is not limited to trace lines, wire bond pads, solder pads, and/or the like. First connector 124 is configured to electrically and mechanically connect substrate 104 to another substrate (e.g., substrate 502 shown in FIGS. 5A, 5B and 6). As will be described below, first camera 102 receives signals from and transmits signals to a host processor (e.g., host processor 512 shown in FIG. 5A), which is coupled to another substrate, via first connector 124. In one embodiment, first camera 102 may receive signals from and transmit signals to a host processor via a first control interface (e.g., first control interface 714 shown in FIG. 7).

In one embodiment, first connector 124 is a board-to-board connector. While first connector 124 is shown to be a female connector (and therefore configured to connect to a corresponding male connector), it is noted that first connector 124 may be a male connector, which is configured to connect to a corresponding female connector, or some other connector type.

Figure 2:
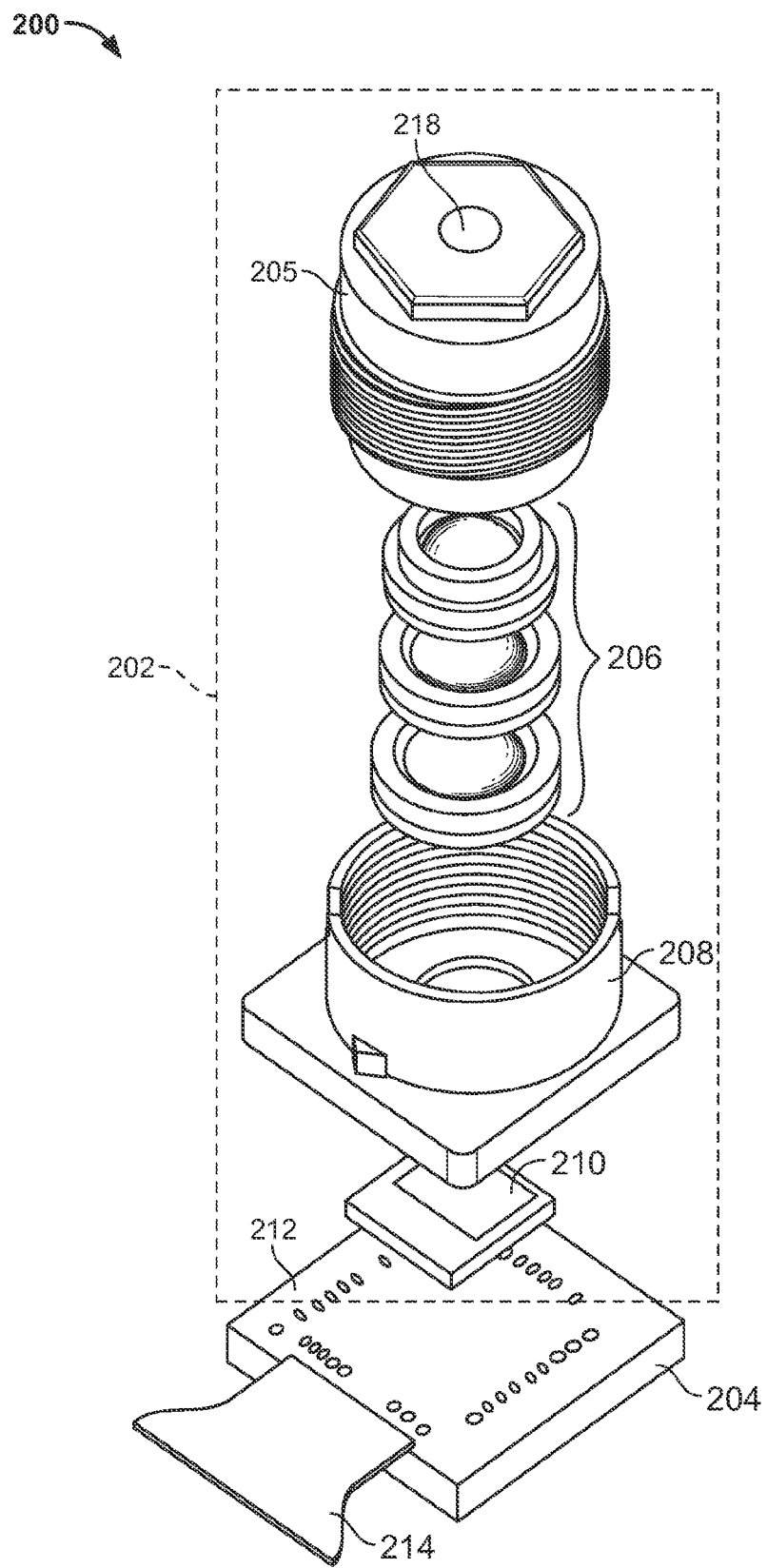
FIG. 2 is an exploded perspective view of a second camera module in accordance with one embodiment.

Second connector 126 is configured to electrically and mechanically connect substrate 104 to another substrate (e.g., substrate 204 shown in FIGS. 2-4). As will be described below, image signal processor 112 receives signals from and transmits signals to a second camera (e.g., second camera 202 shown in FIG. 2) via second connector 126, and the second camera 202 is coupled to another substrate.

In one embodiment, second connector 126 is a zero insertion force (ZIF) wire-to-board connector. In accordance with this embodiment, second connector 126 is configured to receive the bare ends of wires that are pre-stripped and formed into a ribbon cable (e.g., a flexible flat cable). While second connector 126 is shown to be a ZIF wire-to-board connector, it is noted that second connector 126 may be replaced with a ribbon cable, which is configured to connect to a ZIF wire-to-board connector located on another substrate. Still other implementations of second connector 126 may be used.

FIG. 2 is an exploded perspective view of a second camera module 200 in accordance with one embodiment of the present invention. As shown in FIG. 2, second camera module 200 includes second camera 202 and substrate 204. Second camera 202 includes a lens barrel 205, one or more lenses 206, a lens housing 208, and an image sensor 210. Lens barrel 205 is configured to house lens(es) 206. Lens housing 208 is formed to receive and house lens barrel 205. Lens(es) 206 are configured to receive light from a light source via an opening 218 of lens barrel 205. Image sensor 210 is configured to detect light transmitted through lens(es) 206 and convert the detected light to an electrical signal that represents an image. The electrical signal is transmitted to image signal processor 112 (as shown in FIG. 1) for processing. Accordingly, image signal processor 112 is configured to process images captured from both first camera 102 and second camera 202. As will be described below, the electrical signal may be transmitted to image signal processor 112 via a connector 214.

In accordance with one embodiment, second camera 202 may be a fixed focus camera. In accordance with another embodiment, second camera 202 may be an autofocus camera. In accordance with yet another embodiment, second camera 202 may be a moving images camera, which can be used for example to conduct video calls. In accordance with yet a further embodiment, second camera 202 may be a still image camera.

Substrate 204 has a top side 212 and bottom side 302 (as shown in FIG. 3). Image sensor 210 may be directly mounted mechanically and electrically to top side 212. Image sensor 210 may be mounted mechanically and electrically to top side 212 via any of a variety of surface mounting techniques known in the art (e.g., flip-chip, wire bonding, ball bonding, chip bonding, and/or the like). As shown in FIG. 4, lens housing 208 is also configured to be directly mounted mechanically and/or electrically to top side 212. Lens housing 208 may be mounted to top side 212 in a manner such that lens housing 208 covers image sensor 210. Accordingly, lens housing 208 may also house image sensor 210 along with lens barrel 205 and lens(es) 206.

As best shown in FIG. 2, top side 212 of substrate 204 includes connector 214. Connector 214 is communicatively coupled to second camera 202 (in particular, to image sensor 210 of second camera 202) via an electrically-conductive material (not shown). The electrically-conductive material may include, but is not limited to, trace lines, wire bond pads, solder pads, and/or the like. Connector 214 is also configured to electrically and mechanically connect substrate 204 to another substrate (e.g., substrate 104 shown in FIGS. 1, 3 and 4). As will be described below, upon coupling substrate 204 to substrate 104, second camera 202 is configured to receive signals from and transmit signals to a host processor (e.g., host processor 512 shown in FIG. 5A), which is coupled to another substrate, via first connector 124 of substrate 104 (as shown in FIG. 1). In one embodiment, second camera 202 may receive signals from and transmit signals to a host processor via a second control interface (e.g., second control interface 710 shown in FIG. 7).

In addition, second camera 202 is also able to receive signals from and transmit signals to image signal processor 112 (as shown in FIG. 1) located on substrate 104 via connector 214.

In one embodiment, connector 214 is a ribbon wire (e.g., a flexible flat cable). In accordance with this embodiment, the ribbon wire is configured to be coupled to a ZIF wire-to-board connector located on another substrate. While connector 214 is shown to be a ribbon cable, it is noted that connector 214 may be replaced with a ZIF wire-to-board connector, which is configured to receive a ribbon cable coupled to another substrate. Still other implementations of connector 214 may be used. First camera module 100 is now shown FIG. 3 is a perspective top view 300 of a coupled first camera module 100 (the components of which are encompassed by the smaller dashed enclosure shown in FIG. 3) and a second camera module 200 (the components of which are encompassed by the larger dashed enclosure shown in FIG. 3) in accordance with one embodiment of the present invention. First camera module 100 is communicatively coupled to second camera module 200 via second connector 126 located on top side 120 of substrate 104 and connector 214 located on top side 212 of substrate 204. In the embodiment depicted in FIG. 3, second connector 126 is a ZIF wire-to-board connector, and connector 214 is a flexible flat cable. By using a flexible flat cable, the position of second camera module 200 with respect to first camera 100 may be easily adjusted during the manufacturing stages of a multi-media device housing first camera module 100 and second camera module 200. It is noted that in accordance with other embodiments of the invention, substrate 104 may be coupled to substrate 204 using other types of connectors that are known in the art without departing from the spirit and scope of the present invention.

As shown in FIG. 3, second camera module 200 is communicatively coupled to first camera module 100 in a manner such that second camera module 200 is laterally positioned with respect to the first camera module 100. As further shown in FIG. 3, second camera module 200 is inverted with respect to first camera module 100 such that top side 120 of substrate 104 is aligned with bottom side 302 of substrate 204 along the same plane. Accordingly, first camera 102 and second camera 202 are facing in substantially opposite directions. As a result, lens(es) 106 of first camera 102 are configured to generally receive light from a first direction, while lens(es) 206 of second camera 202 are configured to generally receive light from a second direction that is opposite to the first direction.

In accordance with one embodiment, first camera 102 is a rear-facing camera of the multi-media device, and second camera 202 is a front-facing camera of the multi-media device. In accordance with another embodiment, first camera 102 is a front-facing camera of the multi-media device, and second camera 202 is a rear-facing camera of a multi-media device.

With continued reference to FIG. 3, lens housing 108 is coupled to top side 120 of substrate 104. As previously stated, lens housing 108 houses lens barrel 105, which houses lens(es) 106 (shown in FIG. 1). Lens housing 108 also houses image sensor 110 (shown in FIG. 1) and image signal processor 112 (shown in FIG. 1).

FIG. 4 is a perspective bottom view 400 of the coupled first camera module 100 and second camera module 200 in accordance with one embodiment of the present invention. As shown in FIG. 4, second camera module 100 is communicatively coupled to first camera module 200 in a manner such that second camera module 200 board is laterally positioned with respect to first camera module 100. As further shown, first camera module 100 is inverted with respect to second camera module 200 such that top side 212 of substrate 204 is aligned with bottom side 404 of substrate 104 along the same plane. Accordingly, first camera 102 and second camera 202 are facing in substantially opposite directions. As a result, lens(es) 106 of first camera 102 are configured to receive light from a first direction, while lens(es) 206 of second camera 202 are configured to receive light from a second direction that is opposite to the first direction.

With continued reference to FIG. 4, lens housing 208 is coupled to top side 212 of substrate 204. As previously stated, lens housing 208 houses lens barrel 205 (shown in FIG. 2), which houses lens(es) 206 (shown in FIG. 2). Lens housing 208 also houses image sensor 210 (shown in FIG. 2).

As previously mentioned, in accordance with one embodiment, first camera 102 is a rear-facing camera of the multi-media device, and second camera 202 is a front-facing camera of the multi-media device. In accordance with this embodiment, bottom side 404 of substrate 102 and second camera 202 (in particular, lens housing 208 of second camera 202) may at least partly define a space in which a display unit of a multi-media device may be located. This is further shown in FIG. 5B, which will be described below.

Figure 5A:
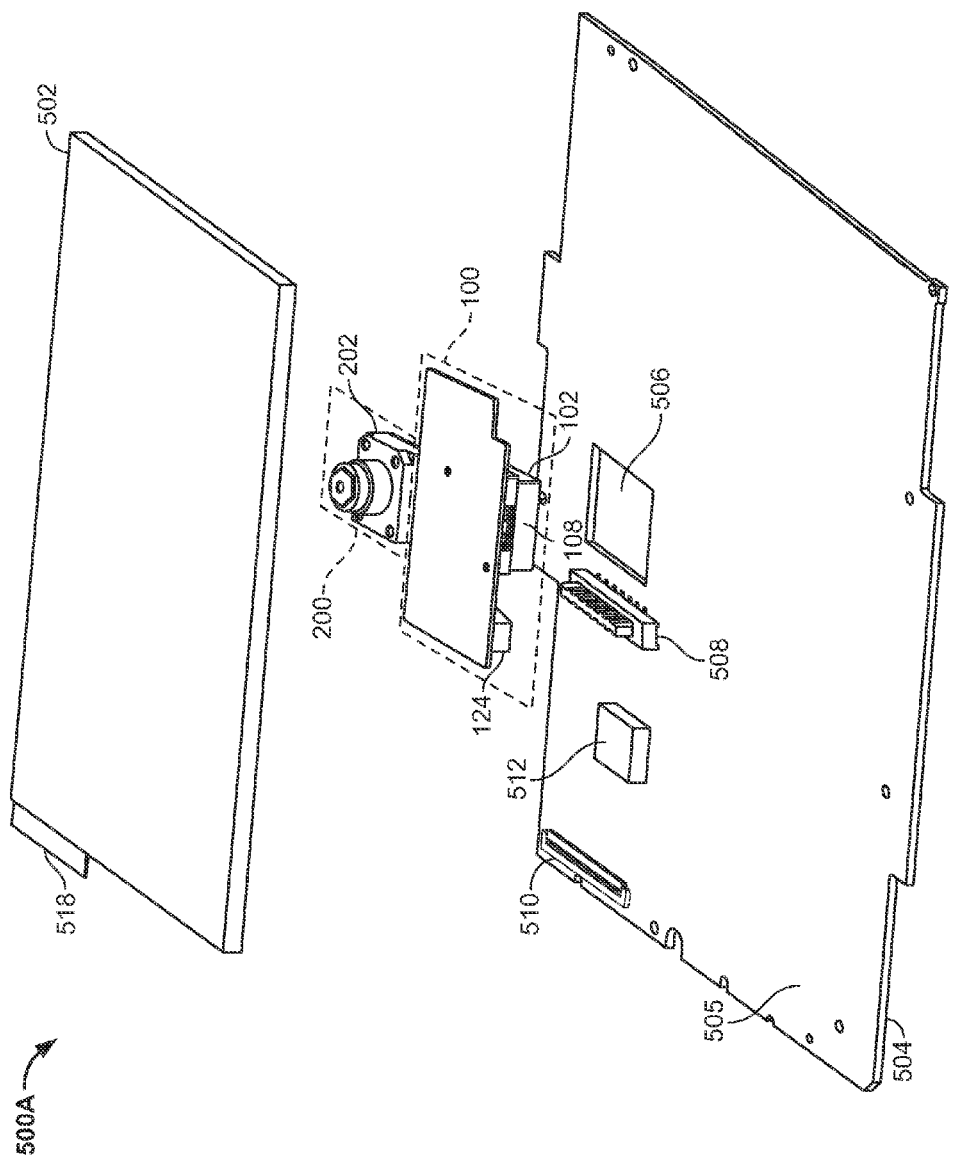
FIG. 5A is an exploded perspective view of a display unit, a coupled first and second camera module and a substrate of a multi-media device in accordance with one embodiment.

FIG. 5A is an exploded perspective view 500A of a display unit 502, the coupled first camera module 100 and second camera module 200, and a substrate 504 of a multi-media device in accordance with one embodiment. Substrate 504 has a top side 505 and a bottom side 602 (shown in FIG. 6). Substrate 504 also includes an opening 506, a first connector 508, a second connector 510, and a host processor 512. As shown in FIG. 5A, opening 506 is formed to receive at least a portion of first camera 102. In particular, opening 506 is formed to be substantially square-shaped in order to receive the cube-shaped lens housing 108 of first camera 102. It is noted that while opening 506 is shown to be substantially square-shaped, opening 506 may be formed to correspond to any shape that is suitable to receive a similarly-shaped lens housing of a camera. For example, if the lens housing of a camera is circular, then opening 506 may be formed to be a substantially circular shape. If the lens housing of a camera is rectangular, then opening 506 may be formed to be a substantially rectangular shape. By providing opening 506 to receive at least a portion a camera, the thickness of the multi-media device that houses substrate 504, the coupled first camera module 100 and second camera module 200, and display unit 502 may be advantageously reduced.

Display unit 502 may be a liquid crystal display (LCD), light-emitting diode (LED) display, an active matrix organic LED (AMOLED) display, or the like. In accordance with certain embodiments, display unit 502 may be a touch screen capable of sensing input from an object, such as a finger or stylus, which touches the touch screen or is positioned above the touch screen. In accordance with this embodiment, display unit 502 may be based on any suitable type of technology that can be used for sensing input. For example, display unit 502 may use resistance, capacitance, surface acoustic waves, infrared, strain gauges, optical imaging, dispersive signals or acoustic pulse recognition for sensing input. It should also be noted that one or more components other than the display unit 502 can be positioned in this arrangement, such as a speaker, an antenna or a processor.

Figure 5B:
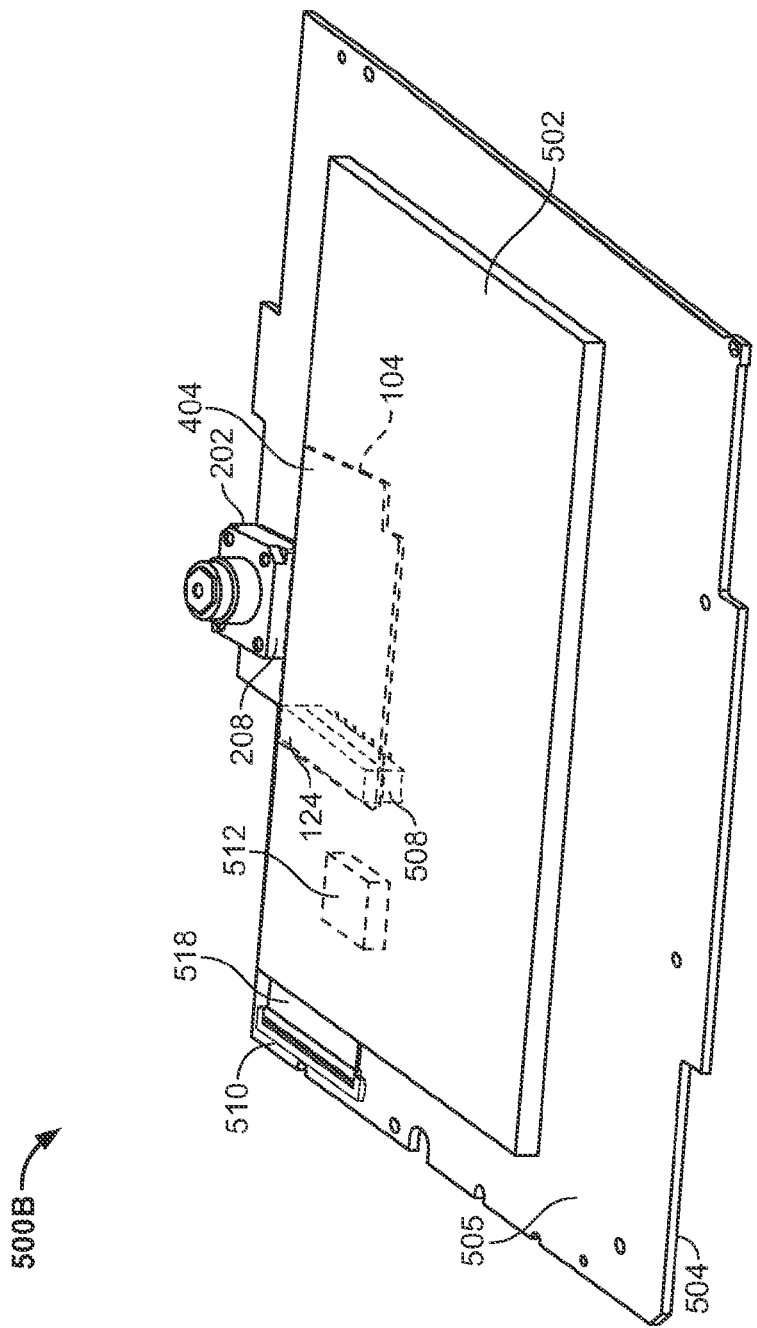
FIG. 5B is a perspective top view of a display unit and a coupled first and second camera module coupled to a substrate of a multi-media device in accordance with one embodiment.

First connector 508 is attached to top side 505 of substrate 504 and is configured to be coupled with first connector 124 of substrate 104. Accordingly, when coupled (as shown in FIG. 5B), substrate 104 is electrically and mechanically coupled to substrate 504.

In one embodiment, first connector 508 is a board-to-board connector. While first connector 508 is shown to be a male connector (and therefore configured to connect to a corresponding female connector (e.g., first connector 124)), it is noted that first connector 508 may be a male connector, which is configured to connect to a corresponding female connector. It is noted that in accordance with other embodiments, substrate 104 may be coupled to substrate 504 using other types of mechanical and electrical connectors that are known in the art.

Second connector 510 is attached to top side 505 of substrate 504 and is configured to be coupled to display connector 518, which is attached to display unit 502. In the embodiment shown in FIG. 5A, second connector 510 is a ZIF wire-to-board connector, and display connector 518 is a ribbon cable (e.g., a flexible flat cable). While second connector 510 is shown to be a ZIF wire-to-board connector, it is noted that second connector 510 may be replaced with a ribbon cable that is attached to substrate 504, which is configured to connect to a ZIF wire-to-board connector located on display unit 502. It is further noted that in accordance with other embodiments, display unit 502 may be coupled to substrate 504 using other types of connectors that are known in the art.

With continued reference to FIG. 5A, host processor 512 is electrically and mechanically mounted to top side 505 of substrate 504. Host processor 512 may be electrically and mechanically mounted to top side 505 using any of a variety of surface mounting techniques known in the art (e.g., flip-chip, wire bonding, ball bonding, chip bonding, and/or the like). Host processor 512 is also communicatively coupled to first connector 508 and second connector 510 via an electrically-conductive material (not shown). The electrically-conductive material may include, but is not limited to trace lines, wire bond pads, solder pads, and/or the like.

Host processor 512 is configured to control and manage many of the primary functions of the multi-media device, which houses substrate 504, the coupled first camera module 100 and second camera module 200, display unit 502 and host processor 512. Host processor 512 may be configured to further process the images processed by image signal processor 112 (shown in FIG. 1). As previously mentioned, image signal processor 112 may process images received from first camera 102 and/or second camera 202. In one embodiment, image signal processor 112 may transmit the images it processes to host processor 512 via a common interface (e.g., common interface 712 shown in FIG. 7).

Host processor 512 may further be configured to receive user input and translate those inputs into signals for first camera 102 and/or second camera 202. The signals may be used to perform a variety of different operations, including, but not limited to, activation of first camera 102 and/or second camera 202, image capture, autofocus, picture resolution configuration, and other operations that configure parameters and settings that may affect a picture.

When activating the autofocus of a camera (e.g., first camera 102), host processor 512 may generate a signal that causes a current to pass through coil 114 (shown in FIG. 1) of first camera 102. As previously mentioned, the current flowing through coil 114 will then generate a magnetic field. The magnetic field generated by the current flowing through coil 114 interacts with a magnetic field of one or more magnets (not shown) in lens housing 108 to generate a rotational force. The rotational force acts as a driving force to rotate lens barrel 105 (shown in FIG. 1) along an optical axis 116 (shown in FIG. 1). Lens barrel 105 is rotated until an appropriate focal length of first camera 102 is reached.

FIG. 5B is a perspective top view 500B of display unit 502 and the coupled first camera module 100 and second camera module 200 coupled to substrate 504 of a multi-media device in accordance with one embodiment of the present invention. As shown, substrate 504 is communicatively coupled to substrate 104 via first connector 508 of substrate 504 and first connector 124 of substrate 104. Accordingly, host processor 512 is communicatively coupled to first camera 102 located on substrate 104 and second camera 202 (using the connection formed between first camera module 100 and second camera module 200 via second connector 126 of substrate 104 and connector 214 of substrate 204 as discussed above).

As further shown, display unit 502 is communicatively coupled to second connector 510 via display connector 518. In addition, display unit 502 is positioned into a space that is at least partly defined by lens housing 208 of second camera 202 and bottom side 404 of substrate 104. In particular, display unit 502 is situated on top of bottom side 404 and below lens housing 208. Additionally, in view of the unique positioning of the lens housing 208, the image-capturing ability of the second camera 202 is unobstructed by the display unit 502. This advantageously creates a compact form factor and reduces the thickness of the multi-media device housing substrate 504, the coupled first camera module 100 and second camera module 200, and display unit 502, while enabling a multiple camera arrangement for such a device.

As further shown, display unit 502 is also situated on top of host processor 512. However, it is noted that host processor 512 may be mounted in a location on substrate 504 such that display unit 502 does not cover host processor 512.

Figure 6:
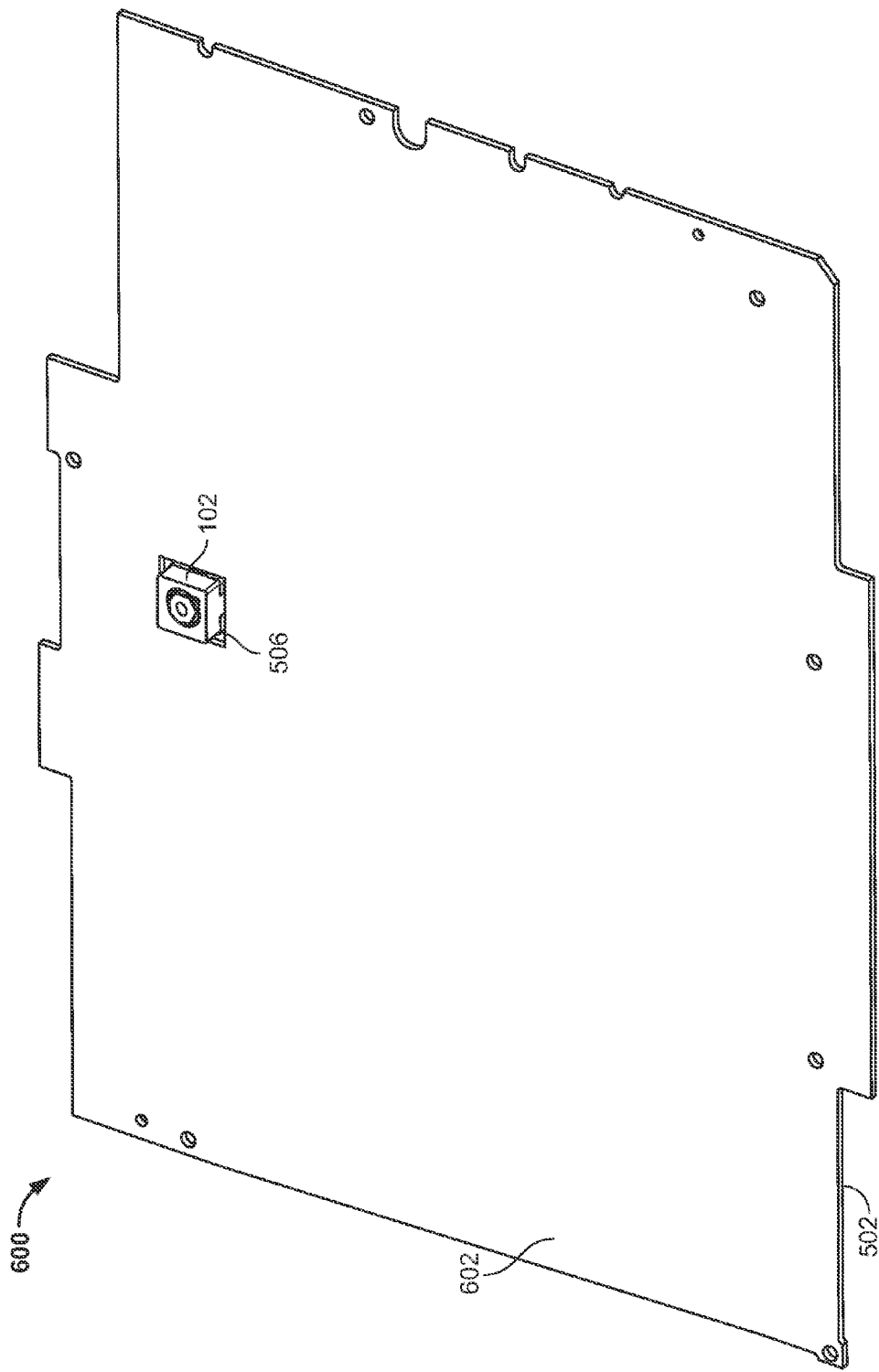
FIG. 6 is a perspective bottom view of a substrate of a multi-media device in accordance with one embodiment.

FIG. 6 is a perspective bottom view 600 of substrate 502 of the multi-media device in accordance with one embodiment. Accordingly, a bottom side 602 of substrate 502 is shown. As further shown in FIG. 6, at least a portion of first camera 102 is received through opening 506, which advantageously reduces the thickness of the multi-media device housing substrate 504, the coupled first camera module 100 and second camera module 200, and display unit 502.

Figure 7:
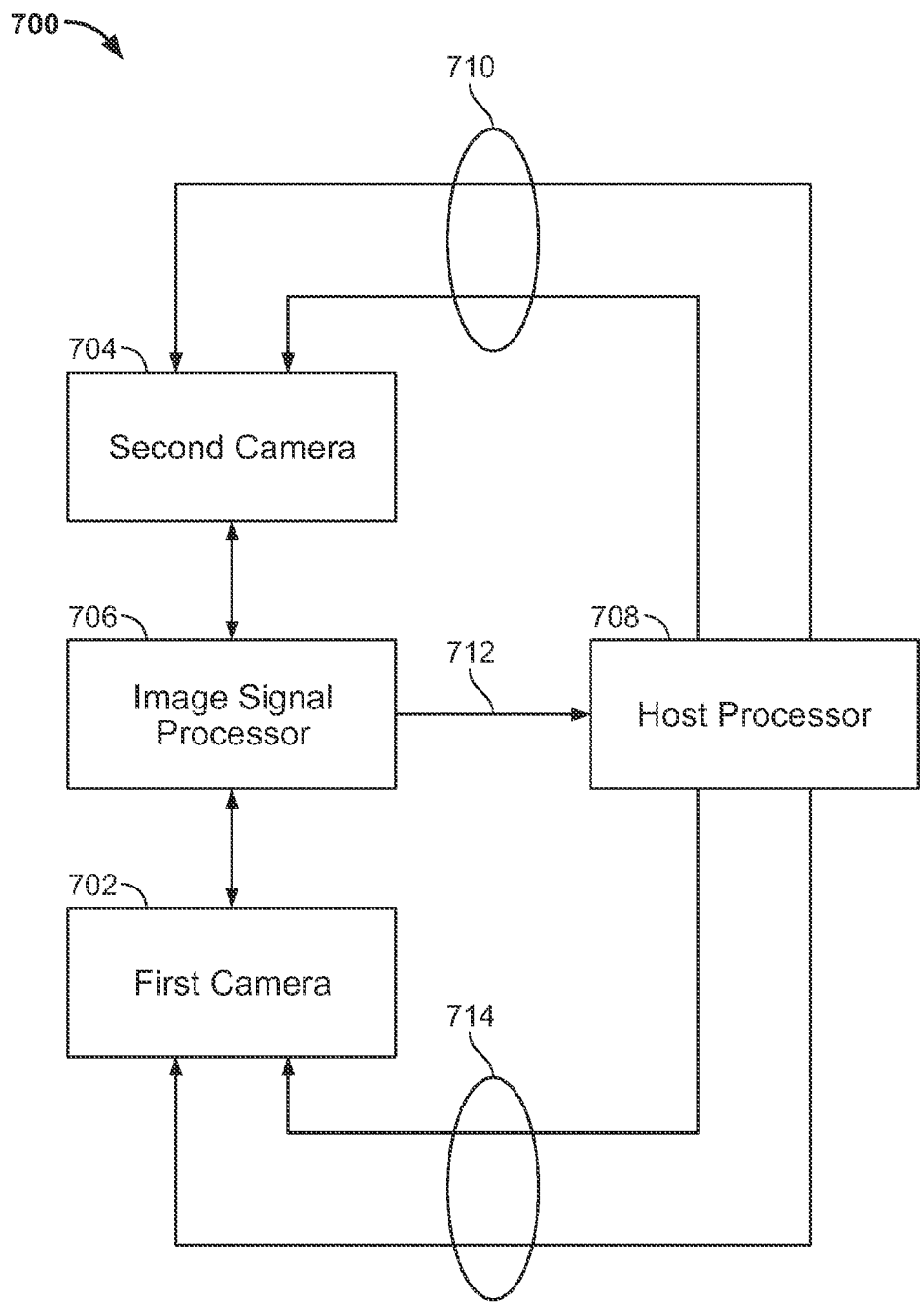
FIG. 7 is a block diagram illustrating several components of a multi-media device in accordance with one embodiment.

FIG. 7 is a block diagram 700 illustrating several components of a multi-media device in accordance to one embodiment. As shown, the multi-media device may include a first camera 702, a second camera 704, an image signal processor 706 and a host processor 708. First camera 702 may comprise one implementation of first camera 102 described above in reference to FIGS. 1, 3-5A and 6. Second camera 704 may comprise one implementation of second camera 202 described above in reference to FIGS. 2-5B. Image signal processor 706 may comprise one implementation of image signal processor 112 described above in reference to FIG. 1.

Host processor 708 may comprise one implementation of host processor 512 described above in reference to FIGS. 5A and 5B.

The multi-media device may also include a common interface 712, a first control interface 714, and a second control interface 710. Common interface 712 couples image signal processor 706 to host processor 708. First control interface 714 couples host processor 708 to first camera 702. Second control interface 710 couples host processor 708 to second camera 704.

In accordance with one embodiment, common interface 712 may be a parallel data bus to transmit image data from image signal processor 706 to host processor 708 in a parallel fashion. In accordance with another embodiment, common interface 712 may be a serial data bus to transmit image data from image signal processor 706 to host processor 708 in a serial fashion. For example, common interface 712 may be a Mobile Industry Processor Interface (MIPI).

First control interface 714 and second control interface 710 may be configured to transmit control signals to first camera 702 and second camera 704 from host processor 708. For example, as previously mentioned, host processor 708 may be configured to receive user input and translate those inputs into signals for first camera 702 and/or second camera 704. The signals may be used to perform a variety of different operations, such as activation of first camera 702 and/or second camera 704, image capture, autofocus, picture resolution configuration and other operations that configure parameters and settings that may affect picture quality or content.

In accordance with an embodiment, first control interface 714 and second control interface 710 may be configured to communicate with an Inter-Integrated Circuit (I2C) bus. Accordingly, commands transmitted via first control interface 714 and second control interface 710 may be configured to be transmitted using the I2C bus.

Image signal processor 706 is communicatively coupled to both first camera 702 and second camera 704. In particular, image signal processor 706 may be communicatively coupled to an image sensor associated with first camera 702 and an image sensor associated with second camera 704.

Generally, host processor 708 may be configured to control and manage many of the primary functions of the multi-media device. To alleviate some of the burden placed on the host processor 708, image signal processor 706 processes images captured by first camera 702 and second camera 704.

Image signal processor 706 may process images captured by first camera 702 and second camera 704 in accordance with any suitable image processing algorithm. For example, as previously mentioned, image signal processor 706 may process raw data from the captured images into a suitable file format, like Y'UV, YUV, YCbCr, YPbPr or any other file format. As another example, image signal processor 706 may perform automatic exposure control (AEC), automatic gain control (AGC) or automatic white balance (AWB) and can resize images as needed. As an option, image signal processor 706 may be further configured to compress the images into a suitable format by employing any available compression standard, such as JPEG or MPEG and their associated variants. It is not necessary that image signal processor 706 perform all these techniques, as some of them may not be necessary or may even be executed by the host processor 708. For example, host processor 708 may be configured to conduct the compression of the captured images.

By using a single image signal processor 706 for the two cameras (i.e., single first camera 702 and second camera 704) as opposed to dedicating a separate image signal processor 706 for first camera 702 and second camera 704, the efficiency of the multi-media device may advantageously be improved. For example, a single image signal processor arrangement can reduce the footprint required on a substrate, can reduce the amount of power needed to process the images and decrease the costs normally associated with such an arrangement.

Once image signal processor 706 processes the images, image signal processor 706 may transmit the images to host processor 708 via common interface 712. Common interface 712 allows for a single interface to be employed to transfer the images (from both first camera 702 and second camera 704) to host processor 708, further reducing spatial requirements and expense. Once received, host processor 708 may further process the images in accordance with any suitable method, such as by compressing the images into an appropriate form. It is noted, however, that more than one interface can be used to transfer images from image signal processor 706 to host processor 708. Additionally, image signal processor 706 is not limited to receiving images from two cameras, as image signal processor 706 may be configured to receive such data from three or more cameras. Moreover, the multi-media device may include multiple image signal processors 706 and/or host processors 708 to process images received from a plurality of cameras.

Figure 8A:
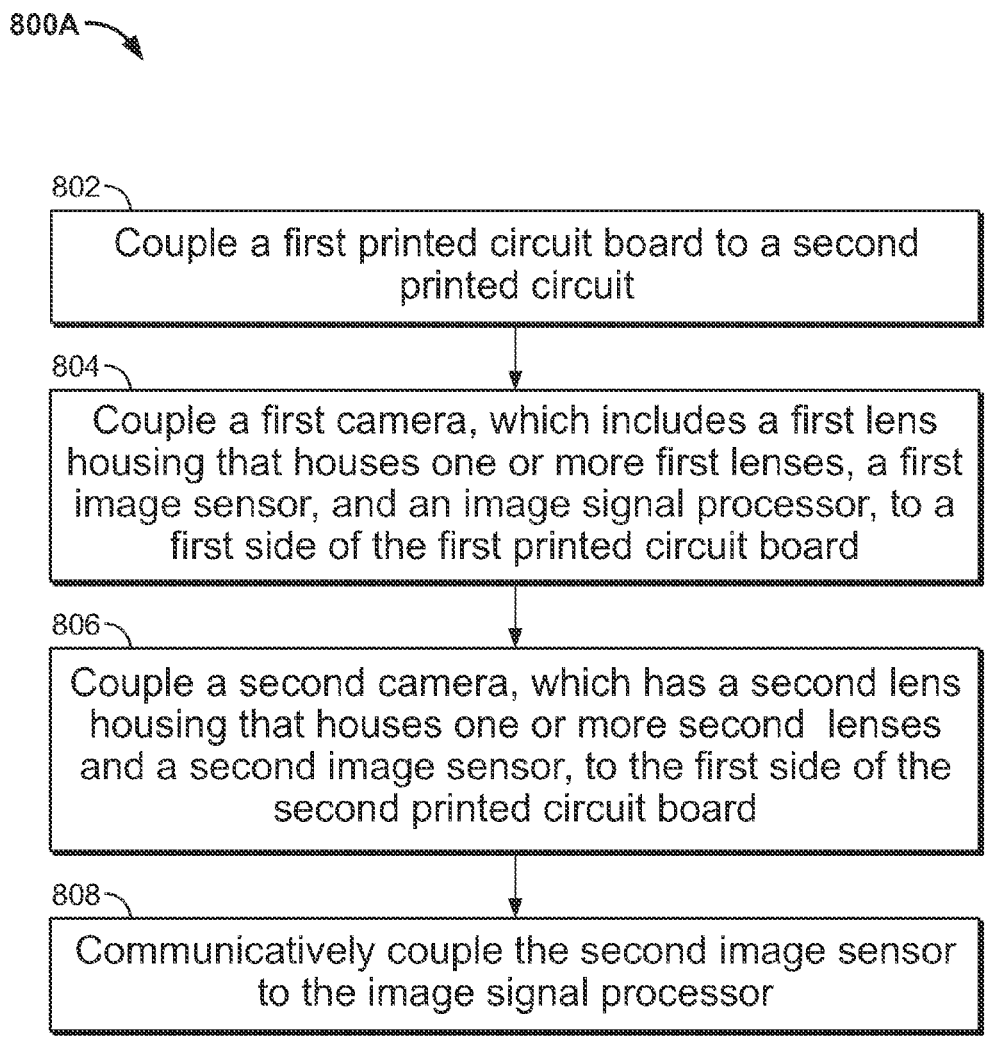
FIG. 8A depicts a flowchart of a method for assembling a coupled first and second camera module in accordance with one embodiment.
Figure 8B:
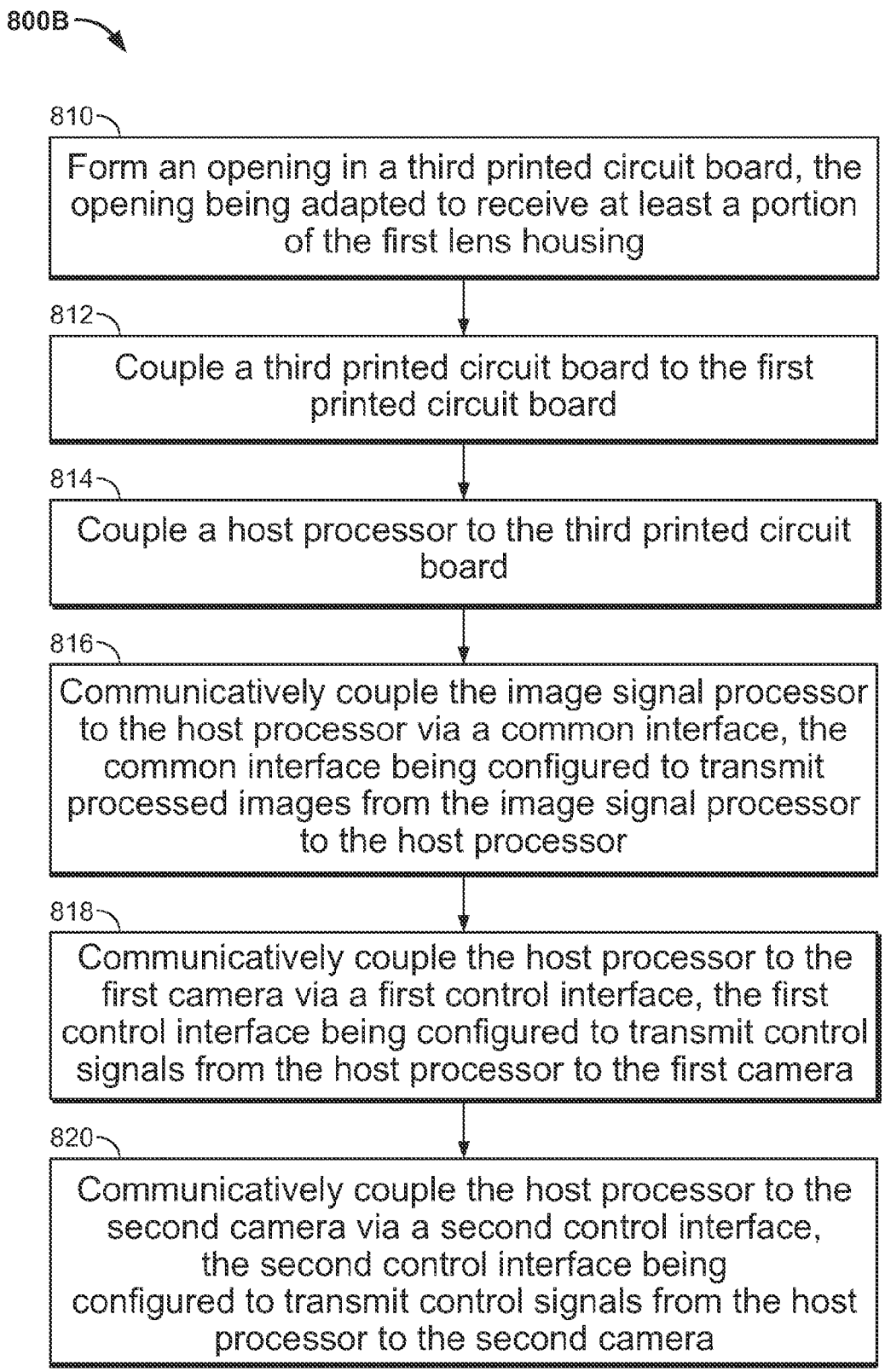
FIG. 8B depicts a flowchart of a method for coupling a coupled first and second camera module to a substrate of a multi-media device in accordance with one embodiment.
Figure 8C:
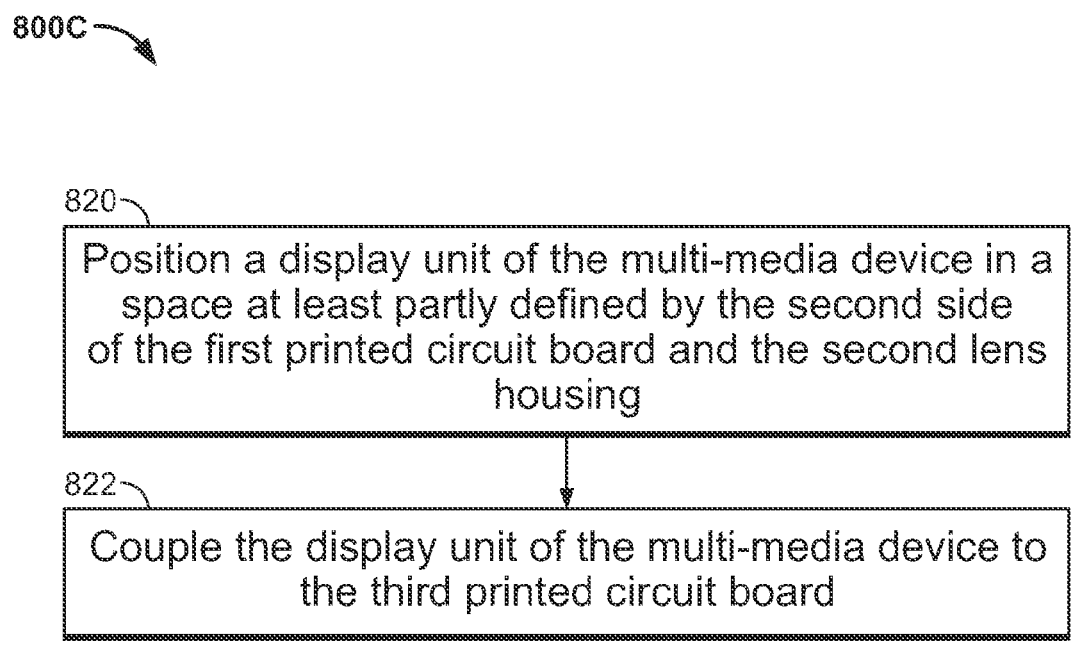
FIG. 8C depicts a flowchart of a method for coupling a display unit of a multi-media device to a substrate of a multi-media device in accordance with one embodiment.

FIGS. 8A-8C depict flowcharts of a method for manufacturing a multi-media device having two cameras in accordance with an embodiment. In particular, FIG. 8A depicts a flowchart 800A of a method for assembling a coupled first and second camera module in accordance with one embodiment. FIG. 8B depicts a flowchart 800B of a method for coupling the coupled first and second camera module to a substrate formed to receive the coupled first and second camera module in accordance with one embodiment. FIG. 8C depicts a flowchart 800C of a method for coupling a display unit (or some other suitable component) of a multi-media device to the substrate formed to receive the coupled first and second camera module in accordance with one embodiment. The steps illustrated in flowcharts 800A, 800B, and 800C may be performed in any order or concurrently unless specified otherwise. Some embodiments do not require that each and every step be performed.

The methods of flowcharts 800A, 800B and 800C are described herein by way of example only and are not intended to be limiting. Furthermore, although the steps of flowcharts 800A, 800B and 800C will be described herein with reference to components illustrated in FIGS. 1-7 persons skilled in the relevant art(s) will readily appreciate that the method need not be implemented using such components.

Turning now to FIG. 8A, the method of flowchart 800A begins at step 802, in which a first substrate (e.g., substrate 104) is coupled to a second substrate (e.g., substrate 204). The first substrate has a first side (e.g., top side 120) and a second side (e.g., bottom side 404) that is opposite to the first side. The second printed circuit also has a first side (e.g., top side 212) and a second side (e.g., bottom side 302) opposite to the first side of the second substrate.

In accordance with an embodiment, the first substrate is coupled to the second substrate using a ZIF connector.

At step 804, a first camera (e.g., first camera 102) is mechanically and electrically coupled to the first side of the first substrate. The first camera includes a first lens housing (e.g., lens housing 108), which houses one or more first lenses (e.g., lens(es) 106), a first image sensor (e.g., image sensor 110), and an image signal processor (image signal processor 112). The image signal processor is configured to process images captured from the first image sensor. Accordingly, the first image sensor and the image signal processor are communicatively coupled together. In accordance with one example embodiment, the first image sensor and the image signal processor may be integrated together as part of an SoC. Accordingly, the image sensor and the image signal processor may be situated on the same silicon substrate. In accordance with another example embodiment, the image sensor and the image signal processor may be located on separate chips. Accordingly, the image sensor and the image signal processor may be situated on different silicon substrates.

At step 806, a second camera (e.g., second camera 202) is mechanically and electrically coupled to the first side of the second substrate. The second camera includes one or more second lenses (e.g., lens(es) 206) and a second image sensor (e.g., image sensor 210).

In accordance with an embodiment, the second substrate is coupled to the first substrate in a manner such that the one or more first lenses of the first camera are configured to receive light generally from a first direction and the one or more second lenses of the second camera are configured to receive light generally from a second direction that is opposite to the first direction.

In accordance with yet another embodiment, the second substrate is coupled to the first substrate in a manner such that the second substrate is laterally positioned with respect to the first substrate.

At step 808, the second image sensor is communicatively coupled to the image signal processor in order to process images captured by the second image sensor. Accordingly, the image signal processor is configured to process images captured by both the first image sensor of the first camera and the second image sensor of the second camera.

Turning now to FIG. 8B, the method of flowchart 800B begins at step 810, in which an opening (e.g., opening 508) is formed in a third substrate (e.g., substrate 504). The opening is adapted to receive at least a portion of the first lens housing of the first camera. Accordingly, the opening is shaped to correspond to or otherwise accommodate the shape of the first lens housing.

At step 812, the third substrate is coupled to the first substrate. In accordance with an embodiment, the third substrate is coupled to the first substrate using a board-to-board connector.

At step 814, a host processor (e.g., host processor 512) is mechanically and electrically coupled to the third substrate.

At step 816, the host processor is communicatively coupled to the image signal processor of the first camera. The image signal processor may transmit processed images to the host processor using a common interface (e.g., common interface 712). Accordingly, host processor is configured to process images captured by both the first image sensor of the first camera and the second image sensor of the second camera.

In accordance to one embodiment, the common interface is parallel interface. In accordance to another embodiment of the invention, the common interface is a serial interface. For example, the common interface may be a MIPI interface.

At step 818, the host processor is communicatively coupled to the first camera via a first control interface (e.g., first control interface 714). The first control interface is configured to transmit control signals from the host processor the first camera.

At step 820, the host processor is communicatively coupled to the second camera via a second control interface (e.g., second control interface 710). The first control interface is configured to transmit control signals from the host processor the second camera.

In accordance to an embodiment, the first and second control interface may be an I2C interface. Using the first control interface, the host processor may perform various operations for both the first camera and the second camera. Such operations include, but are not limited to, camera activation, image capture, autofocus, picture resolution configuration and other operations that configure parameters and settings that may affect picture quality or content.

Referring now to FIG. 8C, the method of flowchart 800C begins at step 820, in which a display unit (e.g., display unit 502) or some other component of the multi-media device is positioned in a space at least partly defined by the second side of the first substrate and the second lens housing of the second camera. In particular, the display unit is situated on top of the second side of the first substrate and below the lens housing. This advantageously creates a compact form factor and reduces the thickness of the multi-media device housing the third substrate (e.g., substrate 504), the coupled first camera module and second camera module, and the display unit (e.g., display unit 502).

At step 822, the display unit of the multi-media device is coupled to the third substrate. In accordance with an embodiment, the display unit is coupled to the third substrate using a ZIF connector.

FIG. 9 is a front view of a multi-media device 900 in accordance with one embodiment. In various embodiments, multi-media device 900 may be a mobile device, such as, but not limited to, a cell phone, a tablet, a personal data assistant (PDA), a laptop computer, a handheld computer or a netbook computer. As shown, multi-media device 900 includes a housing 905, a display 910, and a first camera 930. Display 910 may comprise one implementation of display unit 502 described above in reference to FIGS. 5A-6. First camera 930 may comprise one implementation of first camera 102 described above in reference to FIGS. 1, 3-5A and 6.

As shown, housing 905 has a front side 915, which is the surface of housing 905 that normally faces a user during use of multi-media device 900. Housing 905 at least partially encloses display 910. Accordingly, display 910 is positioned at or on a first side 915 of housing 905. Referring briefly to FIG. 5B, front side 915 may be adjacently-proximate to top side 505 of substrate 504. Accordingly, front side 915 covers top side 505 of substrate 504.

First camera 930 is also shown to be positioned at or on front side 915. Accordingly, first camera 930 is a front-facing camera. In one embodiment, first camera 130 may be a moving images camera, which can be used to conduct video calls. As shown, first camera 930 is positioned above display 910.

Display 910 may be a liquid crystal display (LCD), light-emitting diode (LED) display, an active matrix organic LED (AMOLED) display, or the like. In accordance with certain embodiments, display 910 may be a touch screen 920 capable of sensing input from an object, such as a finger or stylus, which touches touch screen 920 or is positioned above touch screen 920. In accordance with this embodiment, display 910 may be based on any suitable type of technology that can be used for sensing input. For example, display 910 may use resistance, capacitance, surface acoustic waves, infrared, strain gauges, optical imaging, dispersive signals or acoustic pulse recognition for sensing input. In one embodiment, a keypad or keyboard (not shown) may also be implemented into the multi-media device 900 to supplement or take the place of touch screen 920.

Figure 10:
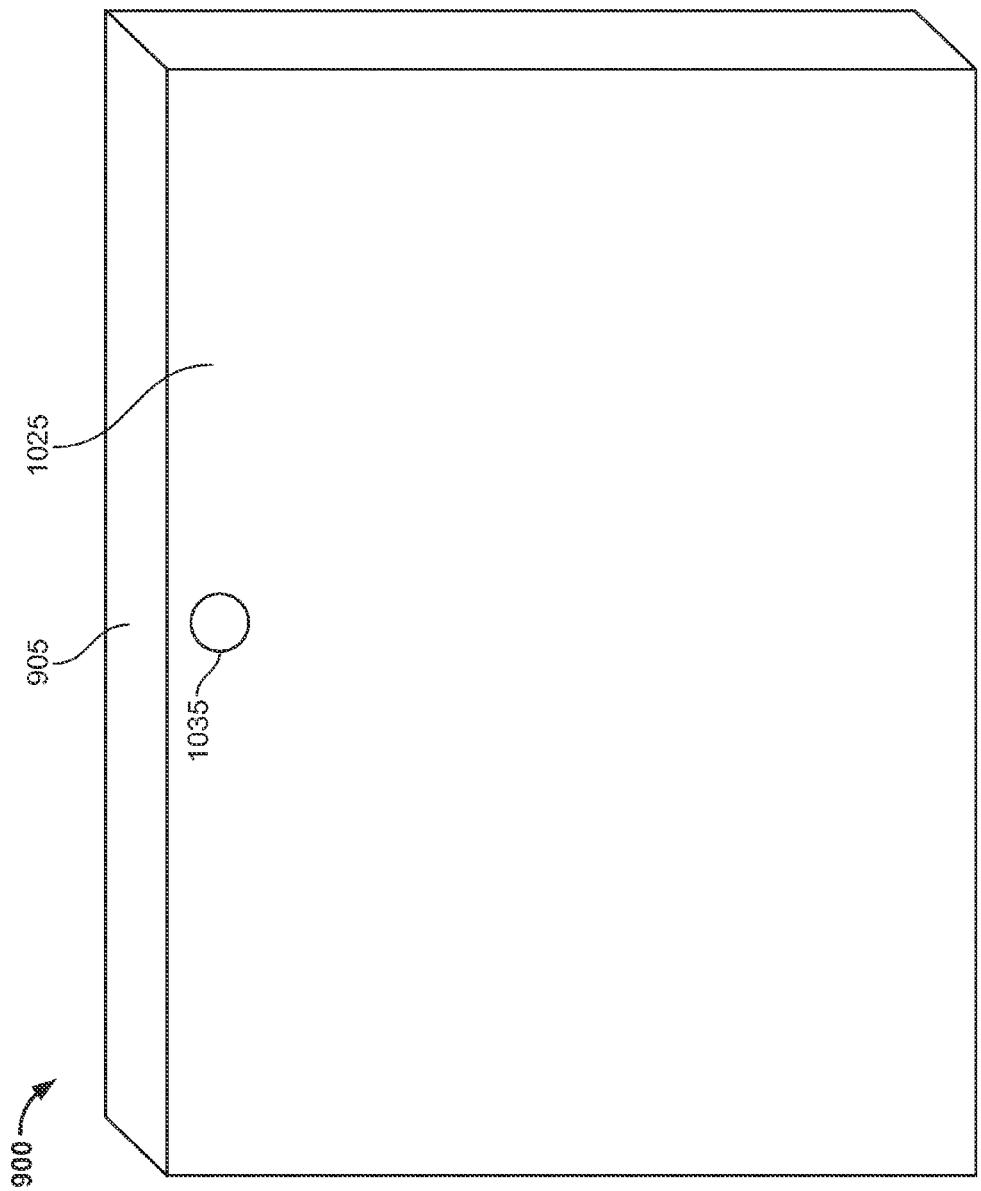
FIG. 10 is a rear view of a multi-media device in accordance with one embodiment.

FIG. 10 is a rear view of multi-media device 900 in accordance to one embodiment of the invention. Accordingly, a rear side 1025 of housing 905, which is opposite to the front side 915, is shown. Referring briefly to FIG. 6, rear side 1025 may be adjacently-proximate to bottom side 602 of substrate 504. Accordingly, rear side 1025 covers bottom side 602 of substrate 504.

Multi-media device 900 includes a second camera 1035. Second camera 1035 may comprise one implementation of second camera 202 described above in reference to FIGS. 2-5B. Because second camera 1035 is positioned at or on rear side 1025, second camera 1035 is a rear-facing camera. In one embodiment, second camera 1035 may be still image camera.

It is noted that while FIGS. 9 and 10 show two cameras (i.e., first camera 930 and second camera 1035), it is understood that multi-media device 900 may contain a greater (or lesser) number of cameras. Moreover, first camera 930 and second camera 1035 may be positioned at locations on multi-media device 900 other than those shown in FIGS. 9 and 10.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the subject matter described herein. Thus, the breadth and scope of such subject matter should not be limited by any of the above-described exemplary embodiments, but should be defined only in accordance with the following claims and their equivalents.

What is claimed is:

1. A multi-media device, comprising:
a first substrate having a first side and a second side opposite to the first side of the first substrate;
a second substrate having a first side and a second side opposite to the first side of the second substrate, wherein the second substrate is coupled to the first substrate;
a first camera mounted to the first side of the first substrate, the first camera comprising
a first lens housing, which houses one or more first lenses; and
a second camera mounted to the first side of the second substrate, comprising
a second lens housing, which houses one or more second lenses;
wherein the second substrate is coupled to the first substrate in a manner such that the one or more first lenses are configured to receive light from a first direction and the one or more second lenses are configured to receive light from a second direction that is opposite to the first direction; and
a display unit that sits over the entire second side of the first substrate and the first camera and below the second camera such that the image-capturing ability of the second camera is unobstructed by the display unit.

2. The multi-media device of claim 1, wherein the second substrate is coupled to the first substrate in a manner such that the second camera is laterally positioned with respect to the first camera.

3. The multi-media device of claim 1, wherein the first camera further comprises:
a first image sensor; and
an image signal processor;
wherein the first lens housing further houses the first image sensor and the image signal processor.

4. The multi-media device of claim 3, wherein the first image sensor and the image signal processor are integrated on a same silicon substrate.

5. The multi-media device of claim 3, wherein the second camera further comprises:
a second image sensor;
wherein the second lens housing further houses the second image sensor, and wherein the second image sensor is communicatively coupled to the image signal processor.

6. The multi-media device of claim 5, wherein the image signal processor processes images captured by both the first image sensor and the second image sensor.

7. The multi-media device of claim 3, further comprising:
a third substrate coupled to the first substrate; and
a host processor coupled to the third substrate, wherein the host processor is communicatively coupled to the image signal processor.

8. The multi-media device of claim 7, further comprising:
a first control interface communicatively coupling the host processor with the first camera; and
a second control interface communicatively coupling the host processor with the second camera, wherein the first control interface transmits control signals from the host processor to the first camera and the second control interface transmits control signals from the host processor to the second camera.

9. The multi-media device of claim 7, further comprising:
a common interface, wherein the common interface communicatively couples the image signal processor to the host processor and the common interface transmits processed images from the image signal processor to the host processor.

10. The multi-media device of claim 7, wherein the host processor further processes images captured by both the first image sensor and the second image sensor.

11. The multi-media device of claim 7, wherein the third substrate includes an opening formed to receive at least a portion of the first lens housing.

12. The multi-media device of claim 1, wherein the first substrate is coupled to the second substrate using a zero insertion force connector.

13. The multi-media device of claim 7, wherein the first substrate is coupled to the third substrate using a board-to-board connector.

14. A method for manufacturing a multi-media device, comprising:
coupling a first substrate to a second substrate, wherein the first substrate has a first side and a second side opposite to the first side of the first substrate, and wherein the second substrate has a first said and a second side opposite to the first side of the second substrate;
mounting a first camera to the first side of the first substrate, the first camera comprising:
a first lens housing, which houses one or more first lenses; and
mounting a second camera to the first side of the second substrate, the second camera comprising:
a second lens housing, which houses one or more second lenses;
wherein the second substrate is coupled to the first substrate in a manner such that the one or more first lenses are configured to receive light from a first direction and the one or more second lenses are configured to receive light from a second direction that is opposite to the first direction; and
positioning a display unit over the entire second side of the first substrate and the first camera and below the second camera such that the image-capturing ability of the second camera is unobstructed by the display.

15. The method for manufacturing a multi-media device of claim 14, wherein the second substrate is coupled to the first substrate in a manner such that the second camera is laterally positioned with respect to the first camera.

16. The method for manufacturing a multi-media device of claim 14, wherein the first camera further comprises:
a first image sensor; and
an image signal processor;
wherein the first lens housing further houses the first image sensor and the image signal processor.

17. The method for manufacturing a multi-media device of claim 16, wherein the first image sensor and the image signal processor are integrated on a same silicon substrate.

18. The method for manufacturing a multi-media device of claim 16, wherein the second camera further comprises:
a second image sensor, wherein the second lens housing further houses the second image sensor.

19. The method for manufacturing a multi-media device of claim 18, further comprising:
communicatively coupling the second image sensor to the image signal processor.

20. The method for manufacturing a multi-media device of claim 18, wherein the image signal processor is configured to process images captured by both the first image sensor and the second image sensor.

21. The method for manufacturing a multi-media device of claim 16, further comprising:
coupling a third substrate to the first substrate; and
coupling a host processor to the third substrate, wherein the host processor is communicatively coupled to the image signal processor.

22. The method for manufacturing a multi-media device of claim 21, further comprising coupling the display unit of the multi-media device to the third substrate.

23. The method for manufacturing a multi-media device of claim 21, further comprising:
communicatively coupling the host processor to the first camera via a first control interface; and
communicatively coupling the host processor to the second camera via a second control interface, wherein the first control interface is configured to transmit control signals from the host processor to the first camera and the second control interface is configured to transmit control signals from the host processor to the second camera.

24. The method for manufacturing a multi-media device of claim 21, further comprising:
communicatively coupling the image signal processor to the host processor via a common interface, wherein the common interface is configured to transmit processed images from the image signal processor to the host processor.

25. The method for manufacturing a multi-media device of claim 21, wherein the host processor further is configured to process images captured by both the first image sensor and the second image sensor.

26. The method for manufacturing a multi-media device of claim 21, further comprising:
forming an opening in the third substrate, wherein the opening is adapted to receive at least a portion of the first lens housing.

27. The method for manufacturing a multi-media device of claim 14, wherein the first substrate is coupled to the second substrate using a zero insertion force connector.

28. The method for manufacturing a multi-media device of claim 21, wherein the first substrate is coupled to the third substrate using a board-to-board connector.

29. A mobile device, comprising:
a front-facing camera mounted on a first substrate, wherein the front-facing camera faces a first direction;
a rear-facing camera mounted on a second substrate, wherein the rear-facing camera faces a second direction that is substantially opposite to the first direction;
a host processor;
an image signal processor that is communicatively coupled to the host processor, wherein the image signal processor processes images captured by both the front-facing camera and the rear-facing camera; and
a display that sits over the entire first substrate and the rear-facing camera and below the front-facing camera such that the image-capturing ability of the front-facing camera is unobstructed by the display.

30. A multi-media device, comprising:
a first substrate having a first side and a second side opposite to the first side of the first substrate;
a second substrate having a first side and a second side opposite to the first side of the second substrate, wherein the second substrate is coupled to the first substrate;
a first camera mounted to the first side of the first substrate, the first camera comprising
a first lens housing, which houses one or more first lenses;
a second camera mounted to the first side of the second substrate, comprising
a second lens housing, which houses one or more second lenses; and
a display unit that is placed over the entire second side of the first substrate and the first camera and is below the second lens housing such that the image-capturing ability of the second camera is unobstructed by the display unit;
wherein the second substrate is coupled to the first substrate in a manner such that the one or more first lenses are configured to receive light from a first direction and the one or more second lenses are configured to receive light from a second direction that is opposite to the first direction.

* * * * *